(12) United States Patent
Maresh

(10) Patent No.: US 11,110,376 B1
(45) Date of Patent: *Sep. 7, 2021

(54) GRAVITY FLUID FILTRATION SYSTEM

(71) Applicant: Joseph D Maresh, West Linn, OR (US)

(72) Inventor: Joseph D Maresh, West Linn, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,972

(22) Filed: Mar. 17, 2020

Related U.S. Application Data

(63) Continuation-in-part of application No. 15/402,221, filed on Jan. 9, 2017, now Pat. No. 10,589,200, which is a continuation-in-part of application No. 14/181,480, filed on Feb. 14, 2014, now Pat. No. 9,975,068.

(60) Provisional application No. 62/387,871, filed on Jan. 8, 2016.

(51) Int. Cl.
*B01D 29/90* (2006.01)
*B01D 29/60* (2006.01)

(52) U.S. Cl.
CPC ............ *B01D 29/90* (2013.01); *B01D 29/605* (2013.01); *B01D 2201/16* (2013.01); *B01D 2201/48* (2013.01)

(58) Field of Classification Search
None
See application file for complete search history.

(56) References Cited

U.S. PATENT DOCUMENTS

| 4,396,505 A * | 8/1983 | Willson | B01D 29/605 |
| | | | 210/97 |
| 6,095,343 A * | 8/2000 | Dooley, Jr. | B01D 29/09 |
| | | | 210/387 |
| 10,589,200 B1 * | 3/2020 | Maresh | B01D 29/605 |

* cited by examiner

*Primary Examiner* — Richard C Gurtowski
(74) *Attorney, Agent, or Firm* — Nick A Nichols, Jr.

(57) ABSTRACT

In a gravity fluid filtration system, upper and lower fluid reservoirs may be mated together. Unfiltered fluid may be supplied to the upper reservoir. One or more filters provide fluid communication between the upper and lower fluid reservoirs. Fluid may pass through the filters into the lower fluid reservoir. The weight of the fluid in the gravity filtration system may be monitored to maximize the fluid flow rate without loss of fluid by supporting the fluid reservoirs on a moveable platform interconnected to a stationary base by a force reactive linkage. Automatic fill components may be provided for automatically actuating a fluid supply valve connected to an unfiltered fluid source. As filtered fluid is withdrawn from the lower reservoir, actuation of the fluid supply valve to an open position may permit unfiltered fluid to be supplied to the upper reservoir. Supply of unfiltered fluid to the upper reservoir may be stopped upon actuation of the fluid supply valve to the closed position. Actuation of the fluid supply valve is a function of the weight of the fluid in the filtration system and/or vertical travel of the moveable platform.

14 Claims, 15 Drawing Sheets

GRAVITY FLUID FILTRATION SYSTEM

CROSS-REFERENCE TO RELATED APPLICATION

This is a continuation-in-part application of non-provisional U.S. patent application Ser. No. 15/402,221, filed Jan. 9, 2017, which claims the benefit of U.S. Provisional Application Ser. No. 62/387,871, filed Jan. 8, 2016, and which is a continuation-in-part of non-provisional U.S. patent application Ser. No. 14/181,480, filed Feb. 14, 2014, which applications are incorporated herein by reference in their entirety.

BACKGROUND

The present invention relates generally to fluid filtration systems and more particularly to a gravity fluid filtration system including automatic filling features which eliminate the need for periodic manual fill requirements of prior art gravity filtration devices, and may further include remote reservoirs which may be automatically kept full.

Typically, prior art water filtration devices consist of filter(s) having outer regions in working contact with the upper unfiltered water reservoir and the output core region of the filter is connected to the lower filtered water reservoir. A filter flange seal may be installed between the upper reservoir and the filter output core to maintain fluid isolation between the upper and lower water reservoirs. These prior art water filtration devices, however, tend to allow filtered water to overflow between the mating surfaces of the two reservoirs in the event water is added when the gravity filtration system is at full capacity, as more fully discussed in Applicant's application Ser. No. 14/181,480, filed Feb. 14, 2014, U.S. Pat. No. 9,975,068, which patent is incorporated herein by reference in its entirety

SUMMARY

In a gravity filtration system, upper and lower fluid reservoirs may be mated together. Unfiltered fluid may be supplied to the upper reservoir. One or more filters may provide fluid communication between the upper and lower fluid reservoirs. Fluid may pass through the filters into the lower fluid reservoir. The weight of the fluid in the gravity filtration system may be monitored to maximize the fluid flow rate without loss of fluid by supporting the fluid reservoirs on a moveable platform interconnected to a stationary base by a force reactive linkage. Automatic fill components may be provided for automatically actuating a fluid supply valve connected to an unfiltered fluid source. As filtered fluid is withdrawn from the lower reservoir, actuation of the fluid supply valve to an open position may permit unfiltered fluid to be supplied to the upper reservoir. Supply of unfiltered fluid to the upper reservoir may be stopped upon actuation of the fluid supply valve to the closed position. Actuation of the fluid supply valve is a function of the weight of the fluid in the filtration system and/or vertical travel of the moveable platform.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
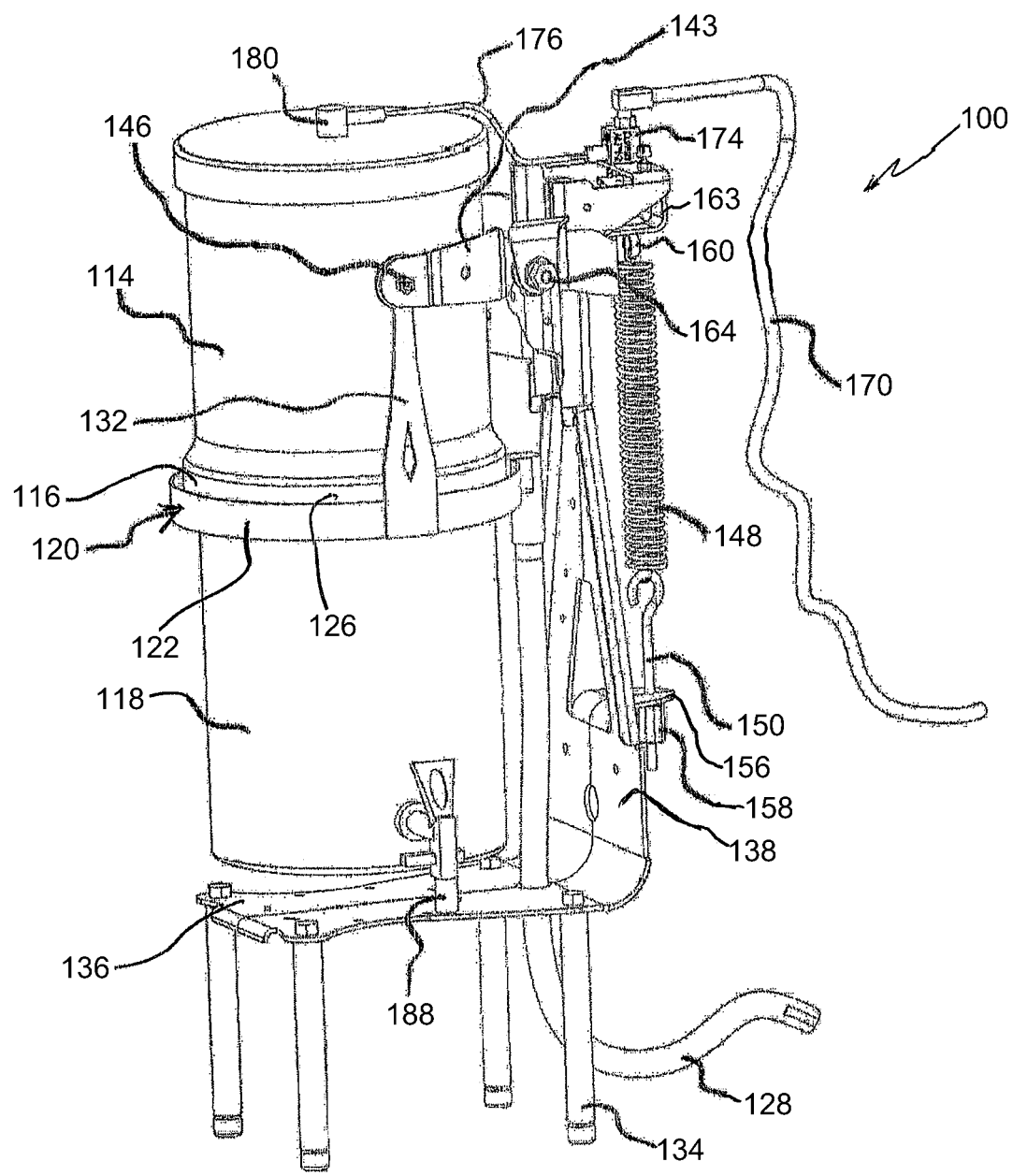
FIG. 1 is a perspective view of a fluid filtration system.

In the drawings and description that follows, like parts are marked throughout the specification and drawings with the same reference numerals. The drawing figures are not necessarily to scale. Certain features may be shown exaggerated in scale or in somewhat schematic form and some details of conventional elements may not be shown in the interest of clarity and conciseness. The invention is subject to embodiments of different forms. Specific embodiments directed to gravity fluid filtration systems are described in detail herein and are shown in the drawings, with the understanding that the disclosure is to be considered an exemplification of the principles of the invention, and is not intended to limit the invention to the illustrated and described embodiments. The different teachings of the embodiments discussed below may be employed with various fluids or separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 2:
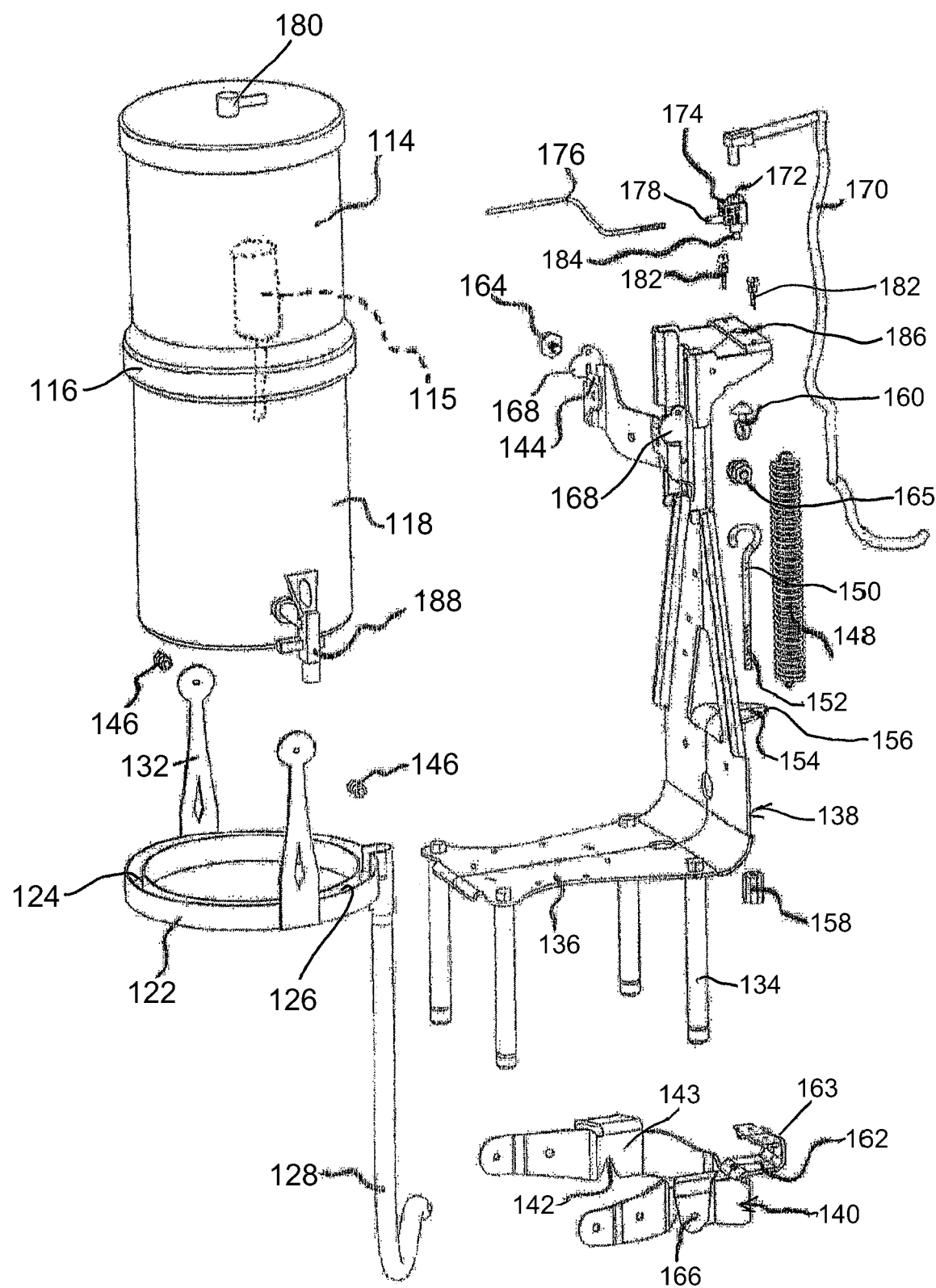
FIG. 2 is an exploded perspective view of the fluid filtration system shown in FIG. 1.

Directing attention now to the FIGS. 1 and 2, a first embodiment of a gravity fluid filtration apparatus is generally identified by the reference numeral 100. The fluid filtration apparatus 100 may include an upper fluid reservoir 114 and a lower fluid reservoir 118 mated together in an unsealed manner. Unfiltered water, for example but without limitation, may be supplied to the upper fluid reservoir 114 and filtered through one or more filters 115 mounted in the upper reservoir 114 so that filtered water is discharged into the lower fluid reservoir 118 of the fluid filtration apparatus 100. The fluid reservoirs 114, 118 are depicted as having a cylindrical shape for illustrative purposes. It is understood however that the fluid reservoirs 114, 118 are not limited to a particular size or shape. A circumferential flange 116 fixed about the lower region of the upper reservoir 114 may be sized and configured to provide a friction connection with the upper outer region of the lower fluid reservoir 118 when the fluid reservoirs 114, 118 are mated together as shown in FIG. 1.

The stacked or mated fluid reservoirs 114, 118 may be supported by a suspension assembly including a ring 120 slid over the lower reservoir 118. The ring 120 may include inner and outer circumferential sidewalls 122 and a bottom wall 124 defining an open circumferential trough or channel 126. The inner sidewall 122 of the ring 120 may engage an unillustrated outwardly extending circumferential rolled edge proximate the upper end of the lower reservoir 118. A drain hose 128 may be connected to a drain opening in the drain channel 126. While leakage between the reservoirs 114, 118 is not expected, the friction connection therebetween is not water tight and filtered water from the lower reservoir 118 may overflow into the channel 126 in the event the lower reservoir 118 is filled with water above its overflow level due to valve leakage and/or other system malfunctions. The outlet end of the drain hose 128 may be placed in the nearest sink, plumbed into a household drain line, or simply directed outdoors.

Referring still to FIG. 1, the mated fluid reservoirs 114, 118 may be suspended on a frame 130. Hanger members 132 may be fixedly secured to the ring 120 diametrically opposite each other. The ring 120 and hanger members 132 support the weight of the reservoirs 114, 118 and the weight of the fluid contained in the apparatus 100.

The frame 130 may be supported on a surface, for example but without limitation, a countertop and the like, on legs 134. The frame 130 may include a base 136 and an upstanding frame member 138 extending upwardly from the base 136. A pivot yoke 140 may be pivotally supported on the frame member 138. The pivot yoke 140 may include inverted V-shaped notches 142 on yoke arms 143 for engagement with knife edges 144 on the frame member 138. That is, the pivot yoke 140 may hang on the frame member 138 and may pivot about knife edges 144, which are spaced apart on the frame member 138. Hanger members 132 may be pivotally connected to the yoke 140 at pins 146 proximate the distal ends of the yoke arms 143.

A lower distal end of a spring 148 may be hooked to a hook 150 that is adjustably secured to frame member 138. The hook 150 may include a threaded portion 152 extending through a hole 154 of a mounting tab 156 of the frame member 138. A knob 158 may be threaded on the hook 150 for adjusting the tension in the spring 148, and thereby adjusting the biasing force applied to the yoke 140. An upper distal end of the spring 148 may be secured to an eyelet hook 160 threadedly secured to the yoke 140 at threaded hole 162 of a yoke extension 163. The yoke 140 may be laterally centered relative to the frame member 138 by jam bolts 164 threaded through yoke holes 166. The jam bolts 164 may be tightened to near contact with side bosses 168 of the frame member 138.

Fluid may be supplied to the upper reservoir 114 through a tube or hose 170 connected to a fluid source. The hose 170 may be connected to an inlet port 172 of a valve 174. A regulated fluid supply tube 176 may be connected between an outlet port 178 of the valve 174 and an inlet port 180 of the upper reservoir 114.

During operation of the gravity filtration apparatus 100, the yoke 140 may rotate or pivot about the pivot points formed by the knife edges 144 of the frame member 138. The knife edges 144 define a pivot axis coincident with a longitudinal axis defined by the jam bolts 164. Stop safety bolts 182 may be secured to the frame member 138 for limiting the upward pivot movement of the yoke extension 163, thereby preventing overload of the valve trigger 184 and associated valve components of the valve 174. The valve 174 may be mounted to the frame 130 so that the valve trigger 184 extends downward through a hole 186 in the frame member 138.

The valve trigger 184 may be actuated as the yoke extension 163 pivots upward and exerts a force against the valve trigger 184. The valve 178 depicted in FIG. 1 may be normally closed. As fluid is removed from the lower reservoir 118 through a spigot 188 and the like, the biasing force of the spring 148 pivots the rearward portion of the yoke 140 downward due to the reduction in fluid weight of the gravity filtration apparatus 100. As the yoke extension 163 pivots downward releasing the force exerted against the valve trigger 184, the valve 174 opens permitting fluid to be supplied to the upper reservoir 114 through the regulated fluid supply tube 176. As fluid is added, the weight of the fluid contained in the gravity filtration apparatus 100 increases to predetermined levels and thereby pivoting the yoke 140 so that the forward portion rotates downward and the yoke extension 163 upward against the valve trigger 184 to close the valve 174.

Figure 3:
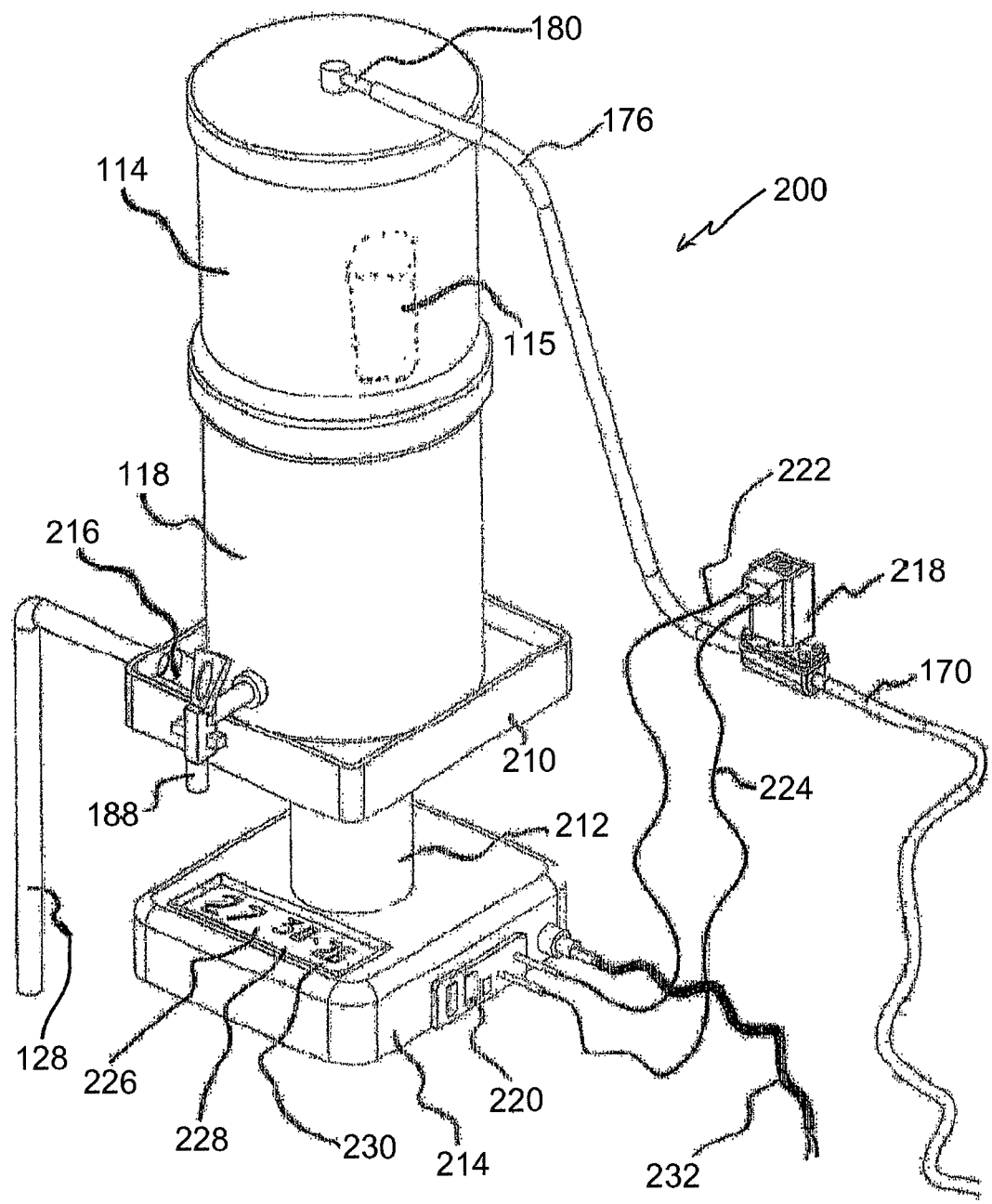
FIG. 3 is a perspective view of a second embodiment of a fluid filtration system.

Referring now to FIG. 3, a second embodiment of a gravity filtration apparatus is generally identified by the reference numeral 200. The gravity filtration apparatus may include an upper fluid reservoir 114 mated to a lower fluid reservoir 118 in an unsealed manner discussed above with reference to gravity filtration system 100 in greater detail. Unfiltered fluid supplied to the upper reservoir 114 may be filtered through one or more filters 115 mounted in the upper reservoir 114 into the lower reservoir 118. Filtered fluid, such as but without limitation, water, may be delivered for use through a spigot 188. The mated reservoirs 114, 118 may be supported by a platform 210 mounted on a column 212 secured on an electronic scale 214. A drain hose 128 may be connected to a platform drain 216 to drain fluid to a sink, into a household drain line, or simply directed outdoors in the event of a scale and/or valve malfunction (or power failure) resulting leakage or overflow conditions.

Unfiltered fluid may be supplied to the gravity filtration apparatus 200 through a supply line 170 having one end connected to a fluid source and the opposite end connected to a supply valve 218. An electric actuator, solenoid, motor screw, or other electronic device may open or close the supply valve 218 as a function of the overall weight of the reservoirs 114, 118 filled with fluid. The scale 214 may be programmable and may include program buttons or switches 220 to set activation points for relay outputs 222 and/or 224 utilized to monitor the weight of the fluid contained by the gravity filtration apparatus 200, where for example but without limitation, the supply valve 218 opens when the water weight drops below 26 pounds (indicator 226), and the supply valve 218 closes when the water weight exceeds 30 pounds (indicator 228). An actual water weight reading of 27 pounds (indicator 230) is illustrated in the display of the example depicted in FIG. 3. With electronic scales, travel of the platform 210 up or down may be minimal. Electronic power for the scale 214 may be provided by batteries, including rechargeable batteries, and/or a power cord 232 plugged into a household electrical outlet.

Figure 4:
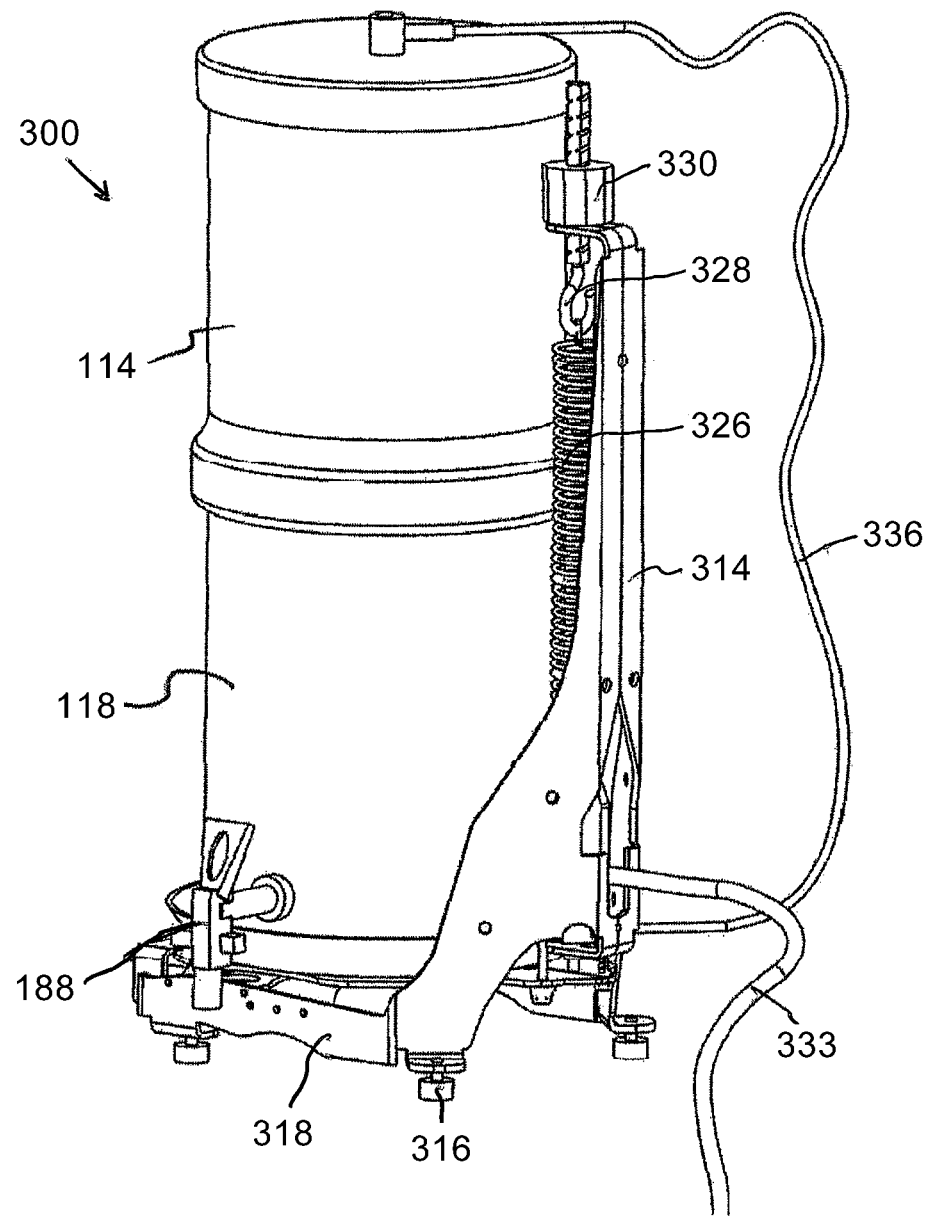
FIG. 4 is a perspective view of a third embodiment of a fluid filtration system.
Figure 5:
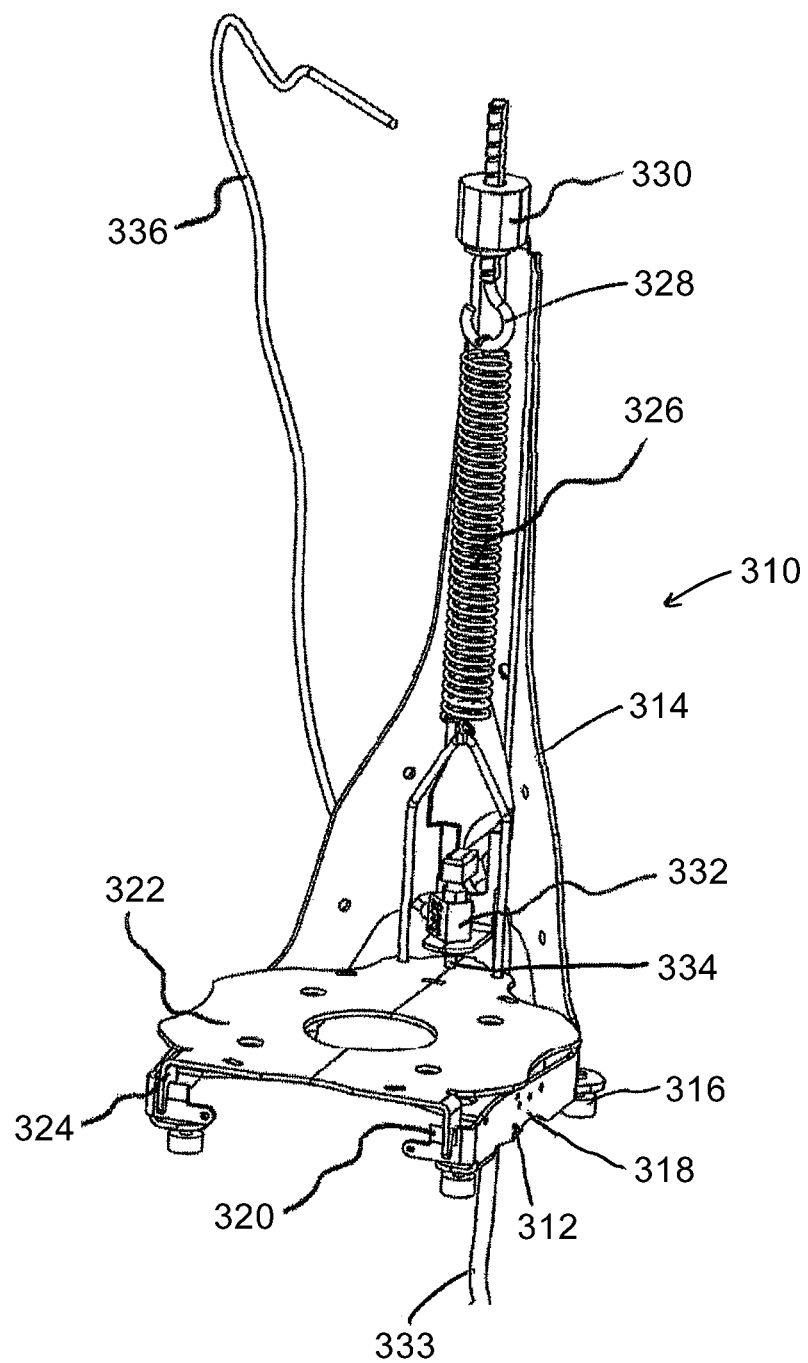
FIG. 5 is a perspective view of a support frame for the fluid filtration system shown in FIG. 4.
Figure 6:
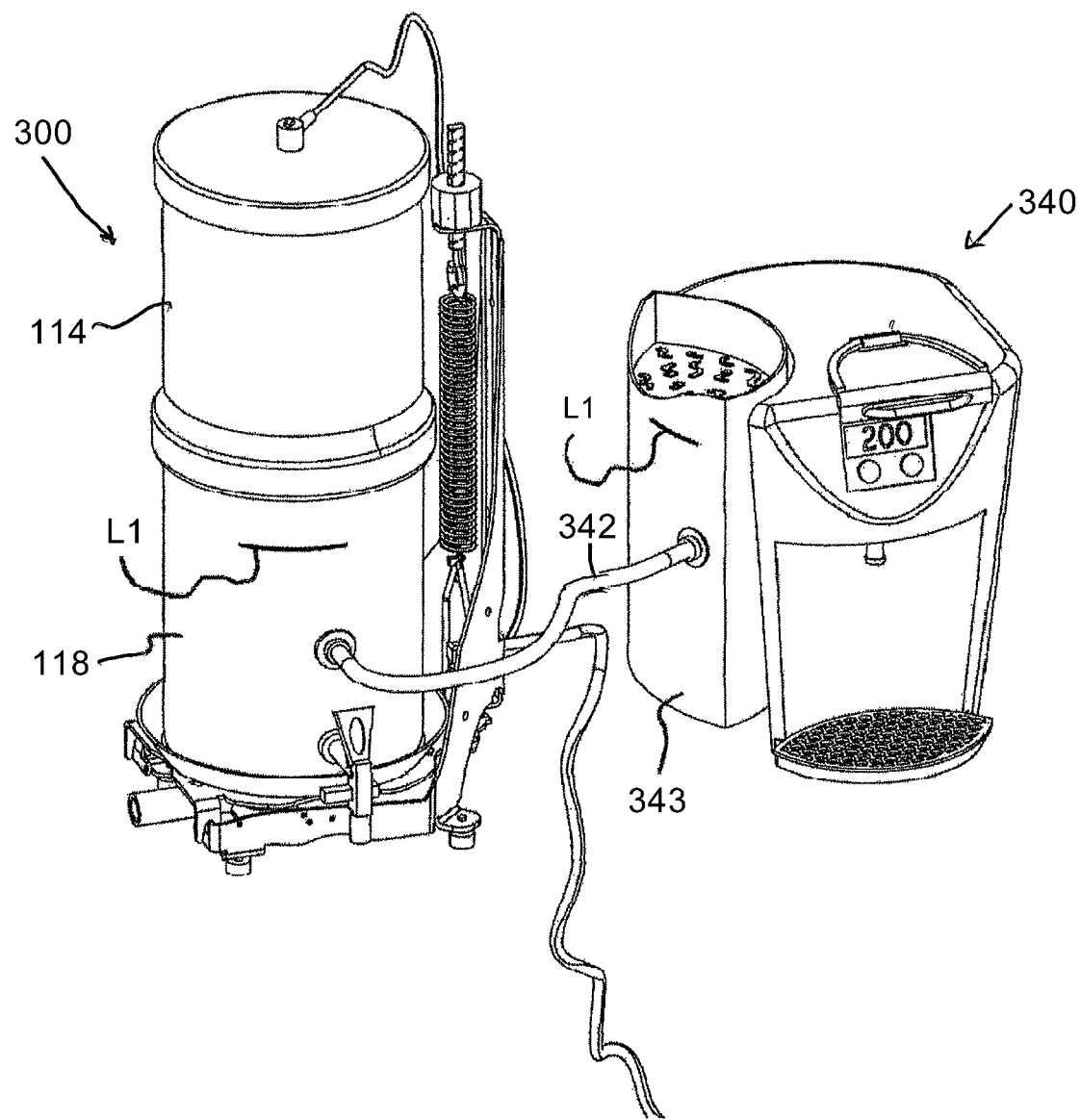
FIG. 6 is a perspective view of the fluid filtration system shown in FIG. 4 connected to coffee maker.
Figure 7:
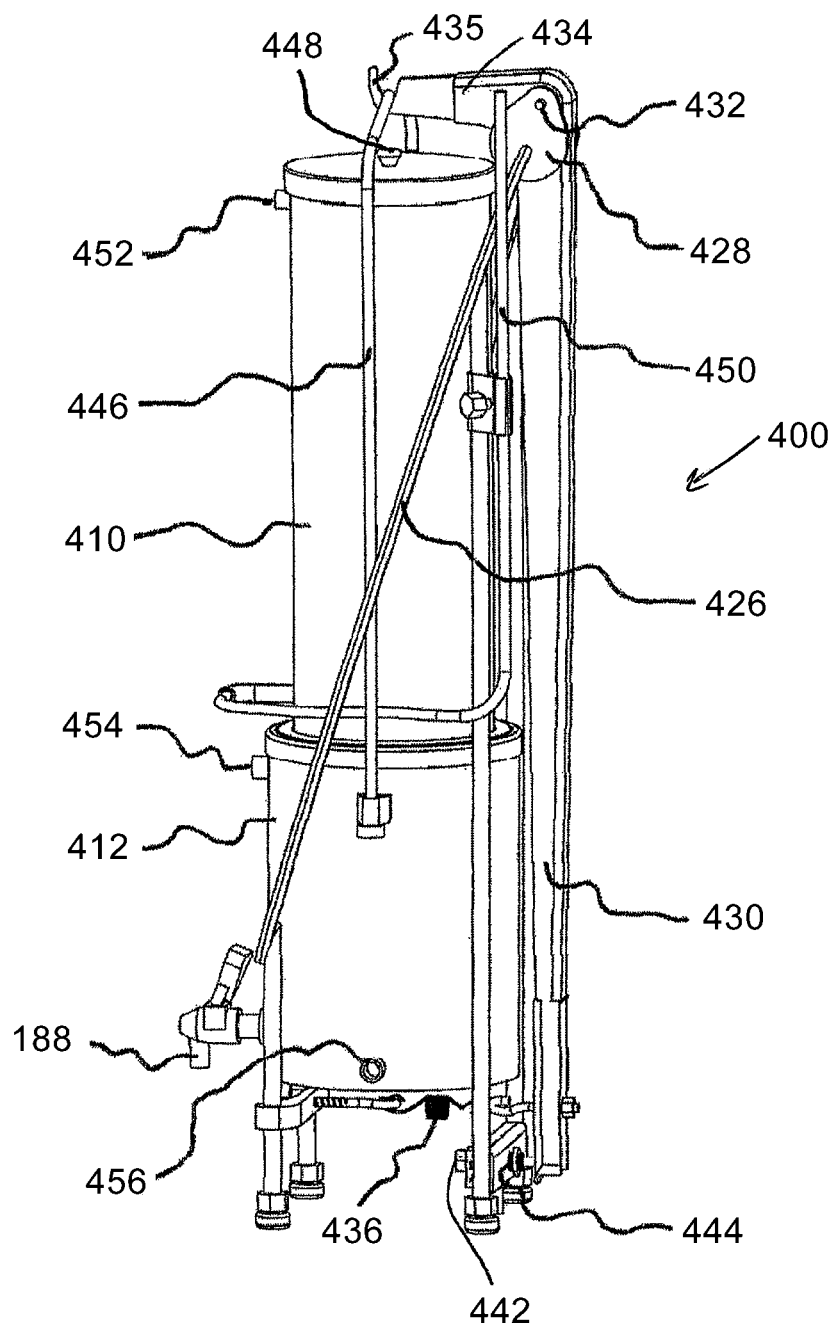
FIG. 7 is a perspective view of fourth embodiment of a fluid filtration system.

Referring now to FIGS. 4-6, a third embodiment of a gravity fluid filtration apparatus is generally identified by the reference numeral 300. The gravity filtration apparatus 300 may include an upper fluid reservoir 114 mated to a lower fluid reservoir 118 in an unsealed manner discussed above in greater detail with reference to gravity filtration system 100. Unfiltered fluid supplied to the upper fluid reservoir 114 may be delivered to the lower fluid reservoir 118 through one or more filters 115 mounted in the upper fluid reservoir 114. Filtered fluid, such as but without limitation, water, may be delivered for local filling of glasses, pots and pans and the like through a spigot 188.

The stacked or mated fluid reservoirs 114, 118 may be supported on a frame 310, best shown in FIG. 5. The frame 310 may include a base 312 and a stanchion 314 extending upwardly from the base 312. The frame 310 may be supported on a surface, for example but without limitation, a countertop and the like, on legs 316. The base 312 may include a pair of sidewall members 318 extending from a lower distal end of the stanchion 314. The sidewall members 318 may be spaced apart substantially parallel to one another and perpendicular to the stanchion 314. The proximal ends of the sidewall members 318 may define knife edge bearings 320 projecting inwardly toward one another.

A platform 322 may be supported on the sidewall members 318. The platform 322 may define a substantially planar surface and include knife edge saddle members 324 projecting downwardly from a proximal end of the platform 322. The knife edge saddle members 324 may include inverted V-shaped notches for engagement with knife edge bearings 320 on the sidewall member 318.

The platform 322 may be biased upwardly by a biasing member, such as but without limitation, a spring 326 having one end connected proximate a distal end of the platform 322. The opposite end of the spring 326 may be secured to a connector 328, such as but without limitation, a hook and the like, adjustably secure proximate a distal end of the stanchion 314. A nut 330 threaded to the connector 328 may be manipulated to adjust the tension in the spring 326 and thereby adjust the upward biasing force applied to the platform 322.

A valve 332, such as the poppet valve depicted in the drawings for purposes of illustration but without limitation, may be fixedly secured to the stanchion 314. The valve 332 may be fixed to the stanchion 314 relative to the platform 322 so that the valve stem 334 projecting downwardly from the valve 332 may be engaged upon upward movement of the platform 322. The valve 332 may be connected to a fluid source, for example, a water well, river and the like by an unfiltered fluid supply line 333. The valve 332 may normally be closed. Upon contact of the platform 322 with the valve stem 334, the valve 332 opens to permit unfiltered water to flow into the upper fluid reservoir 114 through a fluid input conduit 336 connecting the valve 332 to the upper fluid reservoir 114.

Referring now to FIG. 6, the fluid filtration apparatus 300 may be fluidically and/or siphonically connected to a beverage appliance 340 by a conduit 342. The conduit 342 may connect the lower fluid reservoir 118 to a beverage appliance reservoir 343. A steady state water level L1 may be fluidically and/or siphonically established between the lower fluid reservoir 118 and the beverage appliance 340. In this manner, as filtered water is dispensed from the beverage appliance 340, it is automatically replenished from the fluid reservoir 118. As the weight of the water in the upper and lower fluid reservoirs 114, 118 decreases, the biasing force applied by the spring 326 lifts the distal end of the platform 322 upward in to contact with the valve stem 344 and thereby opening the valve 332 so that unfiltered water may be delivered to the upper fluid reservoir 114. The proximal end of the platform 322 may rotate or pivot about the pivot points formed by the knife edge bearings 320 which define a proximal pivot axis.

Referring now to FIGS. 7-9A and 9B, a fourth embodiment of a gravity fluid filtration apparatus is generally identified by the reference numeral 400. The fluid filtration apparatus 400 may include an upper fluid reservoir 410 mated to a lower fluid reservoir 412 in an unsealed manner discussed above in greater detail with reference to gravity filtration system 100. Unfiltered fluid supplied to the upper fluid reservoir 410 may be delivered to the lower fluid reservoir 412 through a filter 414, shown in FIGS. 9A and 9B, mounted in the upper fluid reservoir 410. Filtered water may be dispensed for local filling of glasses, pots and pans and the like through a spigot 188.

The fluid filtration apparatus 400 may occupy a minimal footprint on a countertop and the like and may be connected to one or more countertop appliances. A filter 414 may be secured in the upper fluid reservoir 410. The filter rate of one filter is approximately one or two gallons per hour for most filter media. Such a rate is generally sufficient for households, particularly, as the upper fluid reservoir 410 is typically automatically maintained full so that the water level in the upper fluid reservoir 410 is above the filter 414 during periods of high demand for filtered water. Those skilled in the art may recognize that with manual fill gravity filter apparatus, the water level in the upper reservoir may often drop below the upper region of the top of the filter due to inattention by the user. The automatic functionality of the fluid filtration apparatus 400 ensures a relatively continuous flow rate and the need for multiple filters may be diminished.

Figure 8:
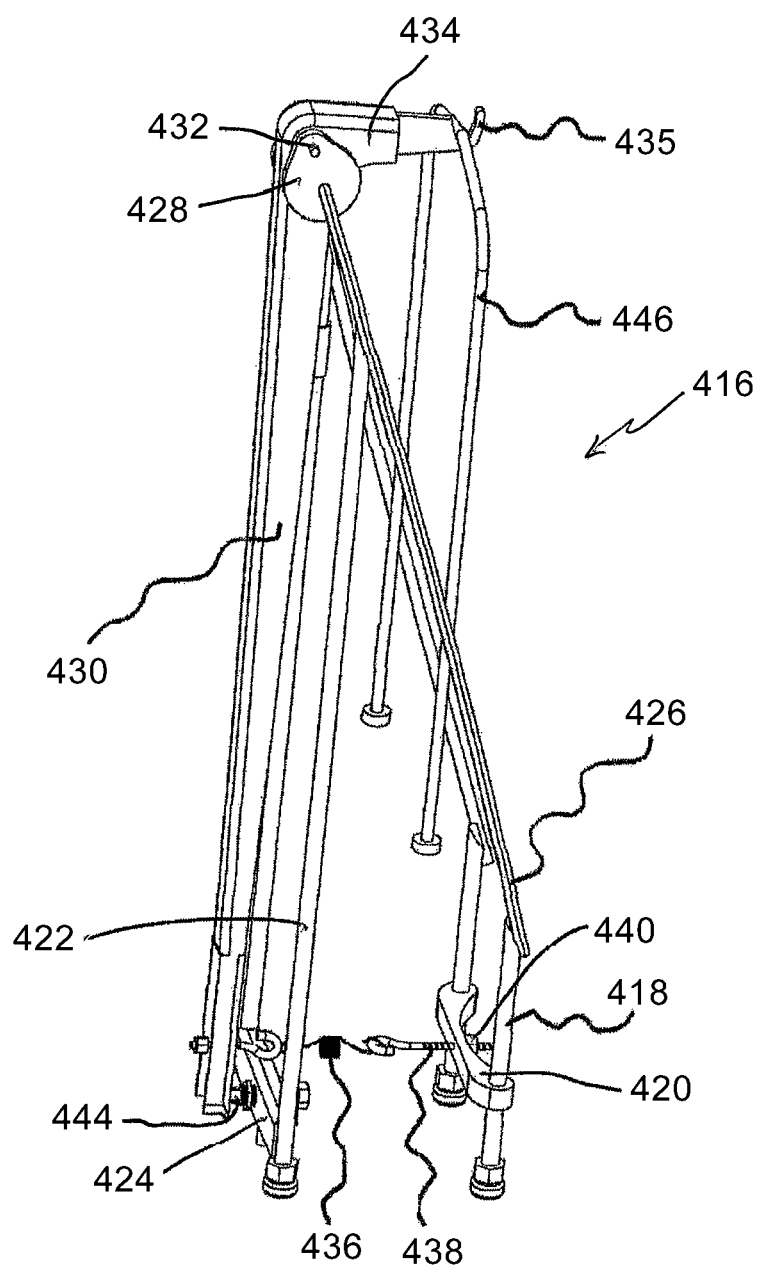
FIG. 8 is a perspective view of a support frame for the fluid filtration system shown in FIG. 7.
Figures 9A, 9B:
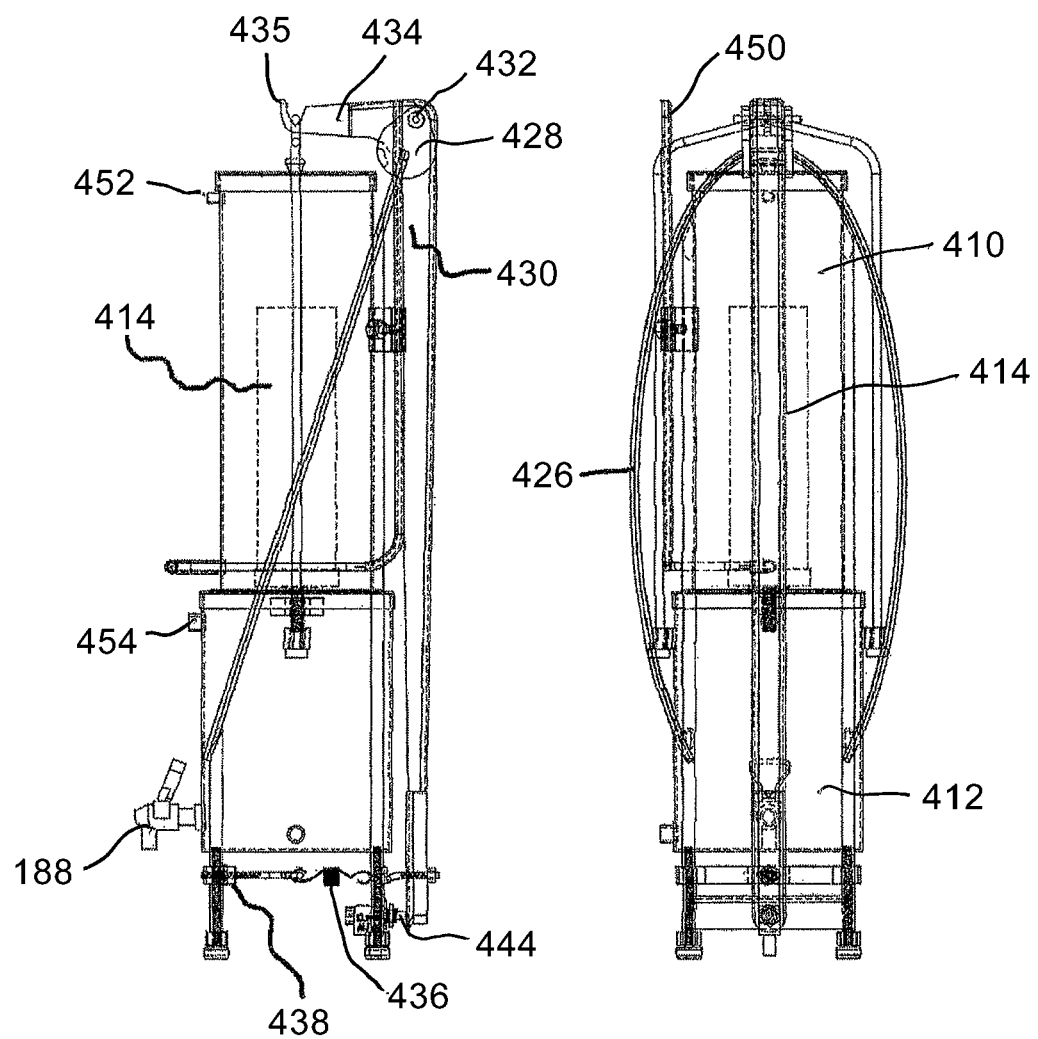
FIG. 9A is a side view of the fluid filtration system shown in FIG. 7.
FIG. 9B is a rear view of the fluid filtration system shown in FIG. 7.

Referring now to FIG. 8, the fluid filtration apparatus 400 may include a frame 416. The frame 416 may include front leg members 418. A front cross member 420 may connect the front leg members 418 to one another and maintain the spacing therebetween. Rear leg members 422 may be spaced rearward from the front frame members 418. A rear cross member 424 may connect the rear leg members 422 to one another and maintain the spacing therebetween. Frame members 426 may connect the front frame members 418 and rear leg members 422 on respective sides forming a generally square or rectangular rigid frame 416.

The upper distal ends of the frame members 426 may be fixedly secured to opposite sides of a yoke 428. An elongated rigid beam 430 may be pivotally secured to the yoke 428 at pivot pin 432. An arm 434 may be fixedly secured proximate the upper distal end of the beam 430. The arm 434 may extend generally horizontally substantially perpendicular to the longitudinal axis of the bean 430, terminating in a hook 435 and the like for conveniently suspending the fluid reservoirs 410, 412 therefrom.

The lower distal end of the beam 430 may be connected to a biasing member, such as but without limitation, an extension spring 436. One end of the spring 436 may be connected to the beam 430 and the opposite end secured to the frame 416 at a connector 438. A nut 440 threaded to the connector 438 may be manipulated to adjust the tension in the spring 436 and thereby adjust the biasing force applied to the beam 430 to rotate the arm 434 about the pivot pin 432.

A valve 442, such as the poppet valve depicted in the drawings for purposes of illustration but without limitation, may be fixedly secured to the rear cross member 424. The valve stem 444 may extend through the rear cross member 424. The stacked fluid reservoirs 410, 412 may be suspend from the arm 434 by a hanger 446 fixedly secured to the lower fluid reservoir 412. The weight of the filled fluid reservoirs 410, 412 applies a downward force to the arm 434 and thereby rotating the lower distal end of the beam 430 out of contact with the valve stem 444 of the valve 442, which is normally closed. As water is dispensed from the lower fluid reservoir 412, the weight of the stacked fluid reservoirs 410, 412 decreases so that the biasing force of the extension spring 436 pulls the lower distal end of the beam 430 into contact with the valve stem 444 thereby opening the valve 442 permitting unfiltered water to flow into the upper fluid reservoir 410 through an inlet port 448. When the dispensed filtered water from the lower fluid reservoir 412 is replaced by unfiltered water entering the upper fluid reservoir 410 the increased weight of the fluid reservoirs 410, 412 rotates the lower distal end of the beam 430 out of contact with the valve stem 444 and closes the valve 442 terminating the flow of unfiltered water into the upper fluid reservoir 410.

Figure 10:
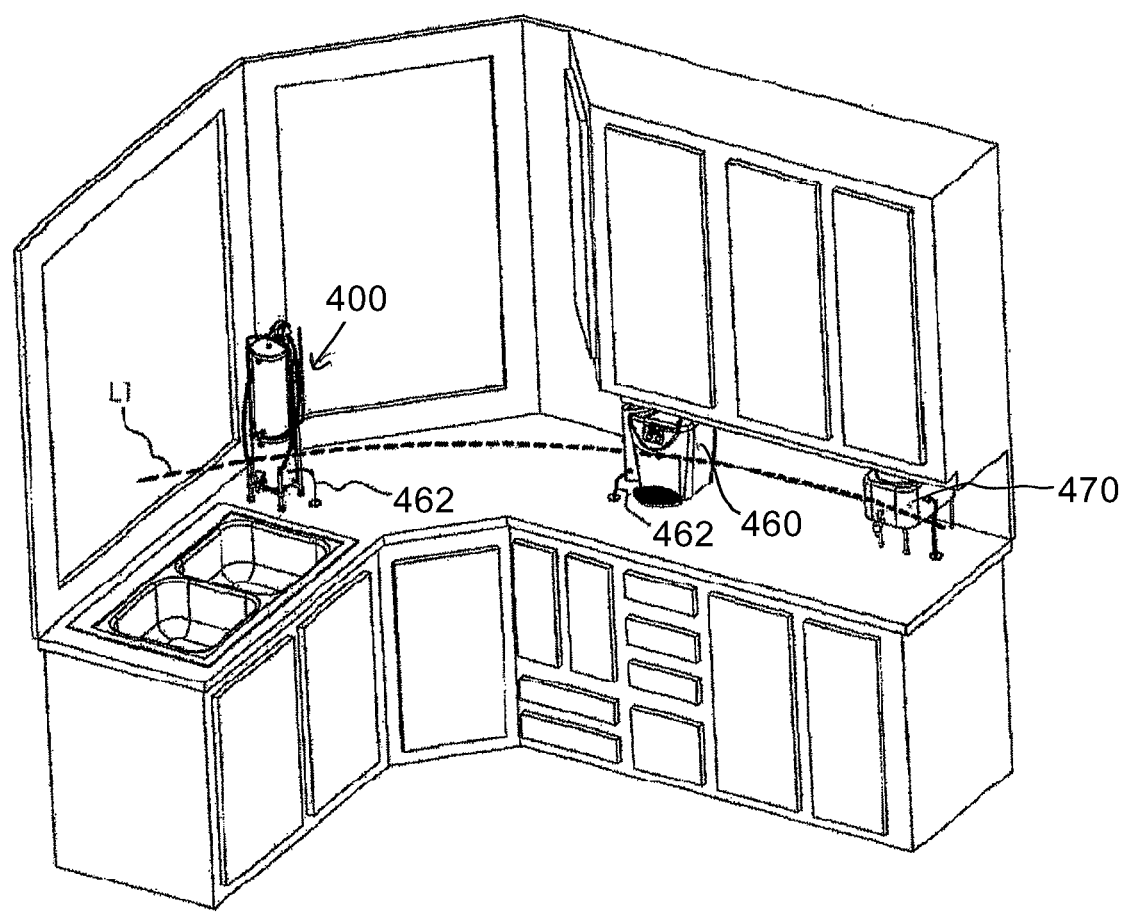
FIG. 10 is a perspective view of a kitchen configuration illustrating the fluid filtration system shown in FIG. 7 connected to a coffee maker and a remote water reservoir.

A sight glass 450 may be provided to visually indicate the water level in the upper fluid reservoir 410. Overflow drains 452 and 454 may be included as desired to direct overflow fluid to a sink and the like in the event of a malfunction resulting from too much fluid entering the fluid reservoirs 410, 412. A filtered water port 456 may provide a connection port for delivering filtered water to appliances and/or remote reservoirs, such as, but without limitation, a coffee maker 460 and a water reservoir 470, illustrated in FIG. 10. For example, a typical kitchen configuration may include the gravity fluid filtration apparatus 400, the coffee maker 460 and water reservoir 470 connected by tubes, hoses and pipes 462 and the like to maintain a filtered water level L1 in each appliance at equal elevations above the countertop during idle periods of operation due to gravitational forces. If the water level L1 in any one reservoir drops, two-way fluidic communication between all water reservoirs restores the water level L1 to an equal level across all reservoirs.

Figure 11:
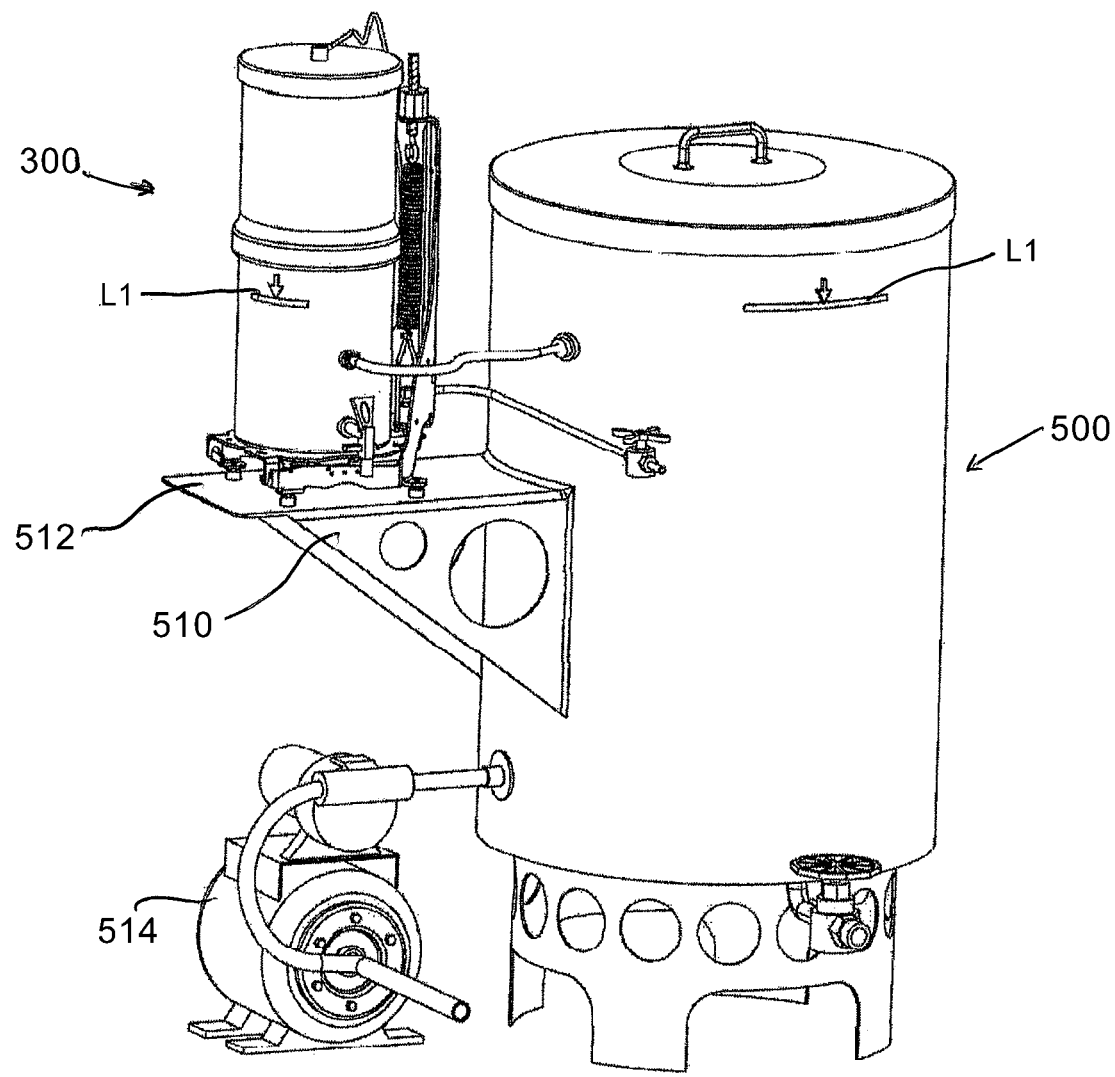
FIG. 11 is a perspective view of the fluid filtration system shown in FIG. 4 connected to a large storage reservoir.

Referring now to FIG. 11, a gravity fluid filtration apparatus 300, for purposes of illustration only, may be fluidically connected to a large storage reservoir 500. The fluid filtration apparatus 300 may be supported on a reservoir stand 510 fixedly secured to the reservoir 500. The stand 510 may provide a flat or planar surface 512 for supporting the fluid filtration apparatus 300 relative to the reservoir 500 so that the water level L1 in the fluid filtration apparatus 300 matches the desired fill point L1 in the reservoir 500. The reservoir 500, for example but without limitation, may be located in a homeowner's garage. Pressured filtered water may be provided throughout the home by an electrically powered pump/accumulator 514 connected to the reservoir 500.

Figure 12:
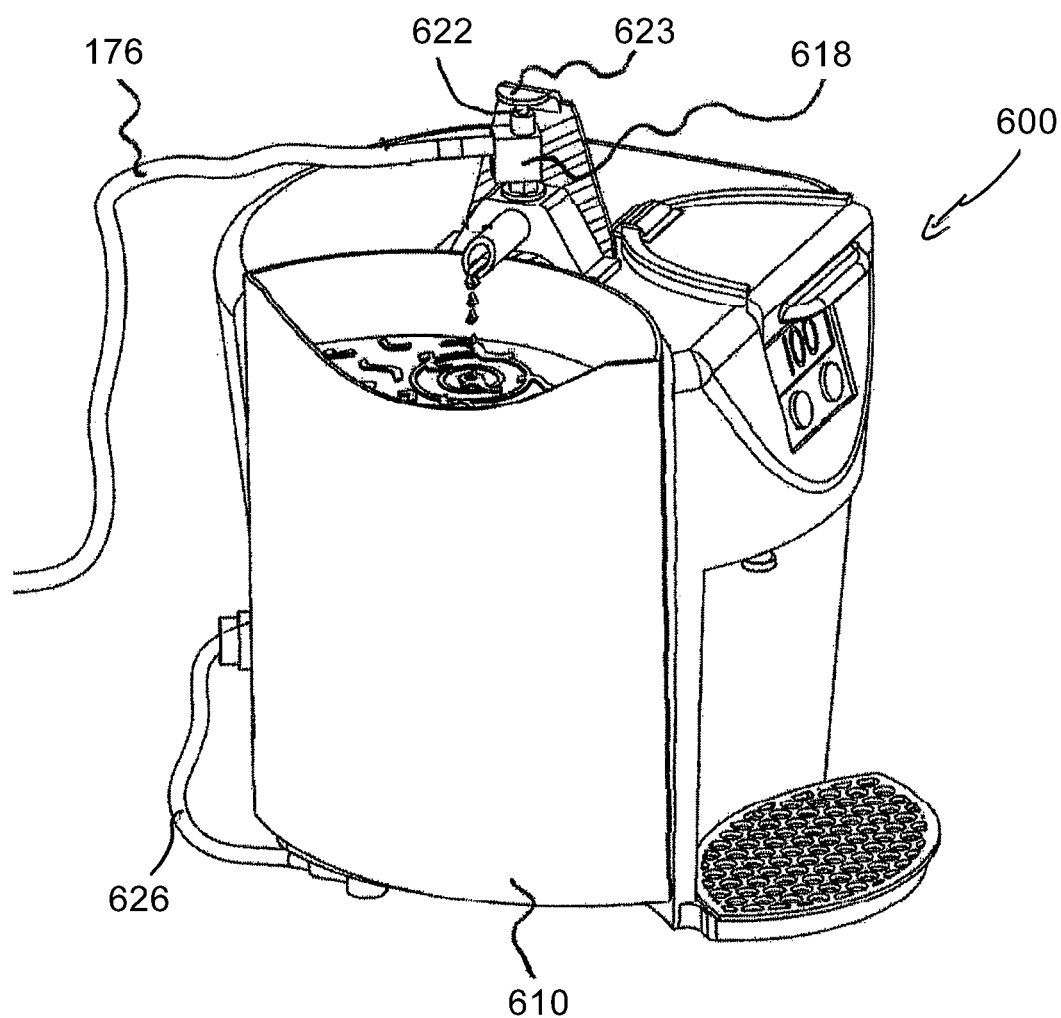
FIG. 12 is a perspective view of a fourth embodiment of a fluid filtration system.
Figure 13:
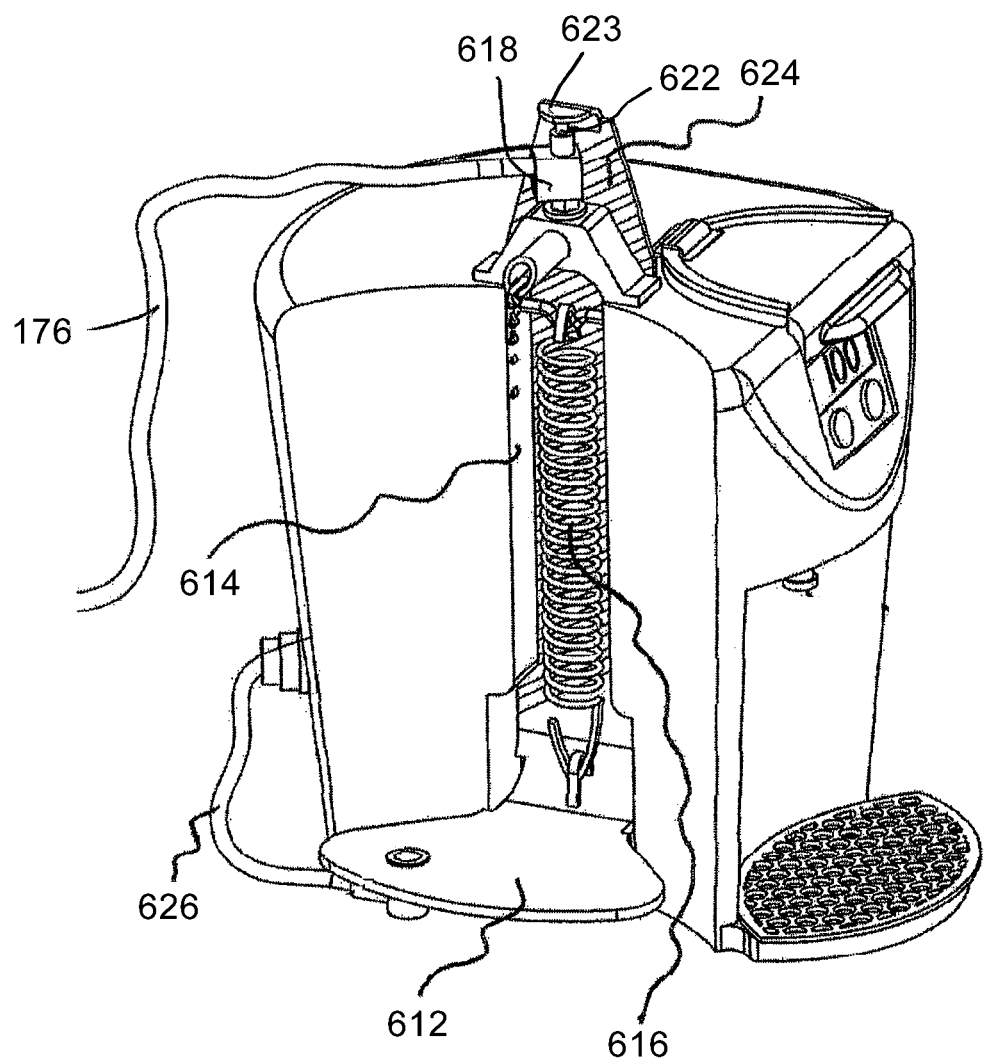
FIG. 13 is a perspective view of the fluid filtration system shown in FIG. 12 with the fluid reservoir removed.
Figure 14:
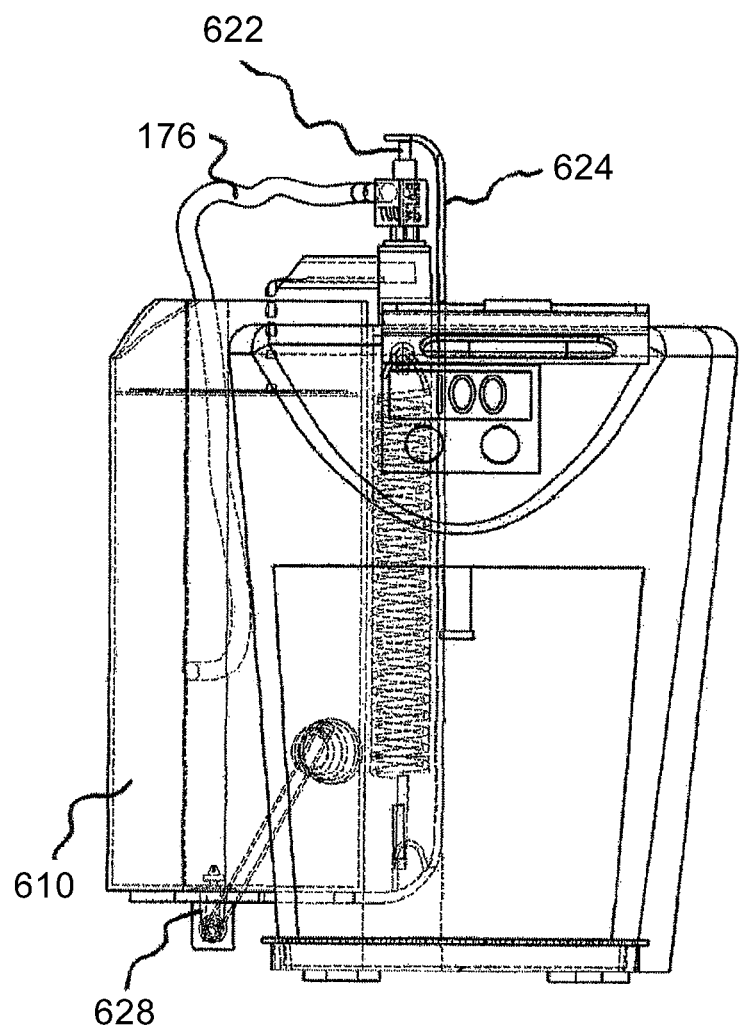
FIG. 14 is a side view of the fluid filtration system shown in FIG. 12 with structural components shown in phantom.
Figure 15:
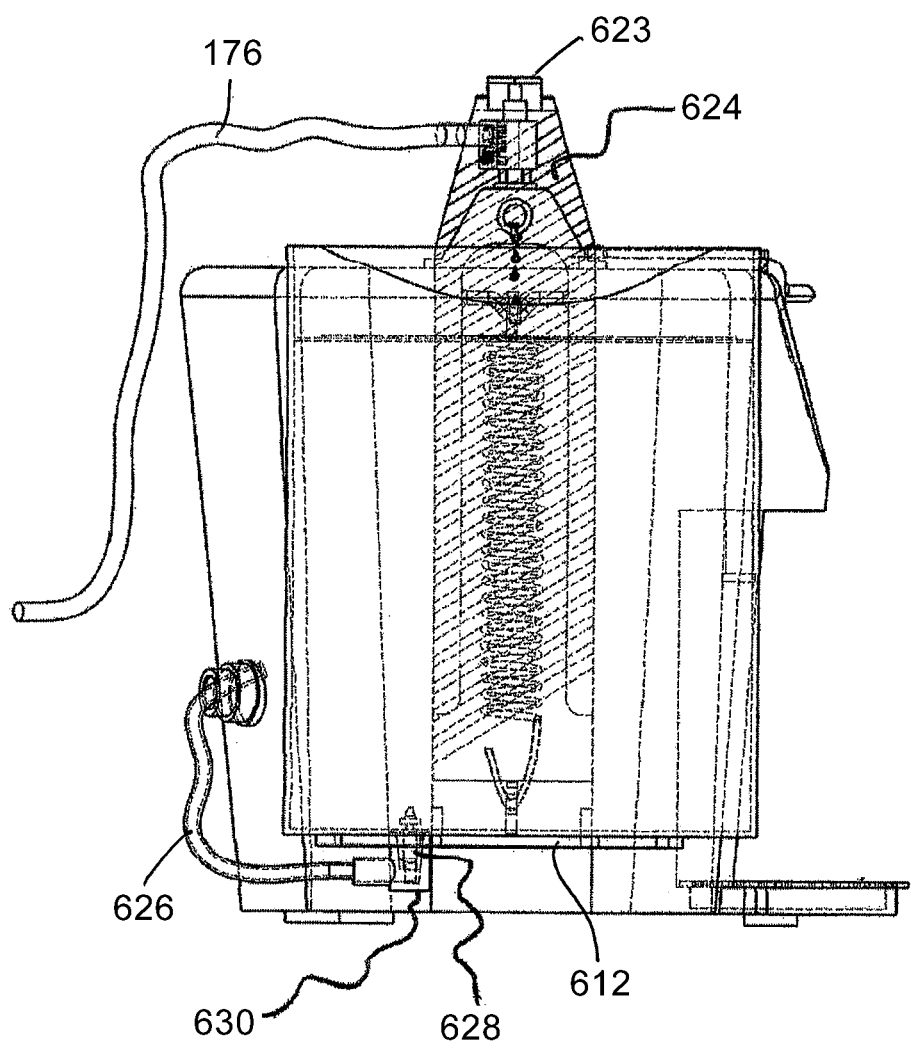
FIG. 15 is another side view of the fluid filtration system shown in FIG. 12 with structural components shown in phantom.

Referring now to FIGS. 12 and 13, a fluid filtration apparatus, such as but without limitation, a beverage maker 600 is shown. The beverage maker 600 may include water reservoir 610 positioned upon a vertically movable platform 612, where the platform 612 is linearly constrained to move along fixed guide members 614. An upwardly biasing force may be applied to the platform 612 by an extension spring 616, shown in FIG. 13. Filtered water may be routed to a poppet valve 618 through supply line 176. The poppet valve 618 is normally open and thus closes as the platform 612 moves downwardly upon increasing water levels in the reservoir 610. Conversely, the platform 612 and reservoir 610 move upwardly as beverage water is dispensed so that the stem 622 of the poppet valve 618 may contact a horizontal tab 623 of an extension 624 of the platform 612, resulting in the poppet valve 618 opening and filling the reservoir 610. Generally, an equilibrium may be achieved based upon the tensile force of the spring 616 and the weight of the water in the reservoir 610. The reservoir 610 may supply water to the beverage apparatus 600 through a waterline 626. Typically a male conical pipe boss 628 underneath the reservoir 610 will seal with a female receiving cone 630 in a watertight manner at the platform 612 with o-rings and the like, and thus allowing removal of the reservoir 610 from the apparatus 600 without resorting to tools and the like. Alternatively, the beverage maker 600 may be placed on scale 214 shown in FIG. 3 and the reservoir water level may be allowed to deviate between two water levels depending upon the maximum and minimum programmable weight values set to respectively close or open an electric solenoid valve and the like.

While preferred embodiments of the invention have been shown and described, other and further embodiments of the invention may be devised without departing from the basic scope thereof, and the scope thereof is determined by the claims which follow.

The invention claimed is:

1. A gravity filtration system, comprising:
   a) a frame designed to rest upon a substantially flat surface;
   b) an upper fluid reservoir and a lower fluid reservoir mated together in substantial vertical alignment supported by said frame; and
   c) a valve connected to an unfiltered fluid source, wherein said valve is actuatable to supply unfiltered fluid to said upper reservoir.

2. The gravity filtration system of claim 1 including a suspension assembly supporting said upper and lower fluid reservoirs on said frame.

3. The gravity filtration system of claim 1 wherein said frame includes a base and a stanchion extending generally upward from said base, a pair of sidewall members spaced apart from one another extending perpendicularly from said stanchion, and further including knife edge bearings projecting inwardly transverse to a longitudinal axis of said pair of sidewall members.

4. The gravity filtration system of claim 3 including a platform supported on said pair of sidewall members, said platform including knife edge saddle members cooperatively engaging said knife edge bearings.

5. The gravity filtration system of claim 4 including a biasing member having one end connected to said platform and an opposite end coupled to a connector movably secured to said stanchion, said biasing member applying a biasing force pivoting said platform about a pivot axis defined by said knife edge bearings.

6. The gravity filtration system of claim 5 wherein said connector is adjustable for adjusting the biasing force applied to said platform by said biasing member.

7. The gravity filtration system of claim 5 including a fluid supply valve operatively connecting an unfiltered fluid source to said upper fluid reservoir engageable upon upward movement of said platform to open and close said fluid supply valve.

8. The gravity filtration system of claim 1 wherein said lower fluid reservoir is fluidically connected to a beverage appliance.

9. The gravity filtration system of claim 1 wherein said lower fluid reservoir is siphonically connected to a beverage appliance.

10. The gravity filtration system of claim 1 including an elongated beam pivotally secured proximate an upper end of said frame, and further including an arm fixedly secured to said beam, said arm extending generally horizontally substantially perpendicular to a longitudinal axis of said beam.

11. The gravity filtration system of claim 10 wherein said upper fluid reservoir and said lower fluid reservoir are suspended from said arm of said beam, further including a biasing member having one end connected proximate a lower distal end of said beam and an opposite end coupled to a connector movably secured to said frame, said biasing member applying a biasing force pivoting said beam about a pivot axis.

12. The gravity filtration system of claim 11 wherein said connector is adjustable for adjusting the biasing force applied to said beam by said biasing member.

13. The gravity filtration system of claim 1 wherein said lower fluid reservoir includes outlet ports connecting said lower fluid reservoir to remote appliances.

14. The gravity filtration system of claim 1 wherein said lower fluid reservoir is fluidically connected to a remote storage reservoir.

\* \* \* \* \*